(12) United States Patent
Chae et al.

(10) Patent No.: US 8,995,037 B2
(45) Date of Patent: Mar. 31, 2015

(54) HOLOGRAPHIC DISPLAY APPARATUS CAPABLE OF STEERING VIEW WINDOW

(75) Inventors: Byung Gyu Chae, Daejeon (KR); Joonku Hahn, Daegu (KR); Hwi Kim, Chungcheongnam-do (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 272 days.

(21) Appl. No.: 13/615,346

(22) Filed: Sep. 13, 2012

(65) Prior Publication Data

US 2013/0208328 A1 Aug. 15, 2013

(30) Foreign Application Priority Data

Feb. 15, 2012 (KR) .................. 10-2012-0015515

(51) Int. Cl.
| | |
|---|---|
| *G03H 1/12* | (2006.01) |
| *G02B 5/32* | (2006.01) |
| *G03H 1/00* | (2006.01) |
| *G03H 1/22* | (2006.01) |

(52) U.S. Cl.
CPC ................ *G02B 5/32* (2013.01); *G03H 1/2202* (2013.01); *G03H 1/2286* (2013.01); *G03H 1/2294* (2013.01); *G03H 2001/2236* (2013.01); *G03H 2001/2242* (2013.01); *G03H 2223/19* (2013.01); *G03H 2225/33* (2013.01); *G03H 2225/60* (2013.01); *G03H 2227/03* (2013.01)

USPC ................................. 359/11; 359/21; 359/34

(58) Field of Classification Search
None
See application file for complete search history.

(56) References Cited

U.S. PATENT DOCUMENTS

| | | | | |
|---|---|---|---|---|
| 5,548,418 | A | * | 8/1996 | Gaynor et al. .................. 359/20 |
| 6,449,090 | B1 | * | 9/2002 | Omar et al. ..................... 359/465 |
| 7,283,112 | B2 | * | 10/2007 | Starkweather et al. ......... 345/84 |
| 8,405,891 | B2 | * | 3/2013 | Kroll et al. ......................... 359/9 |
| 2004/0184145 | A1 | * | 9/2004 | Fridman et al. ................ 359/462 |
| 2010/0149313 | A1 | | 6/2010 | Kroll et al. |

FOREIGN PATENT DOCUMENTS

KR 10-2010-0017869 A 2/2010

OTHER PUBLICATIONS

R. Häussler et al., "Large real-time holographic displays: from prototypes to a consumer product", 2009, SPIE and IS&T.

\* cited by examiner

*Primary Examiner* — Jade R Chwasz

(57) ABSTRACT

Holographic display apparatuses are provided. The holographic display apparatus may include a light source module generating coherent light, at least two input optical systems converging the light generated from the light source module on at least two converging points, an output optical system mixing the lights provided from the at least two input optical systems to provide a hologram image, and a spatial light modulating module modulating the light.

17 Claims, 8 Drawing Sheets

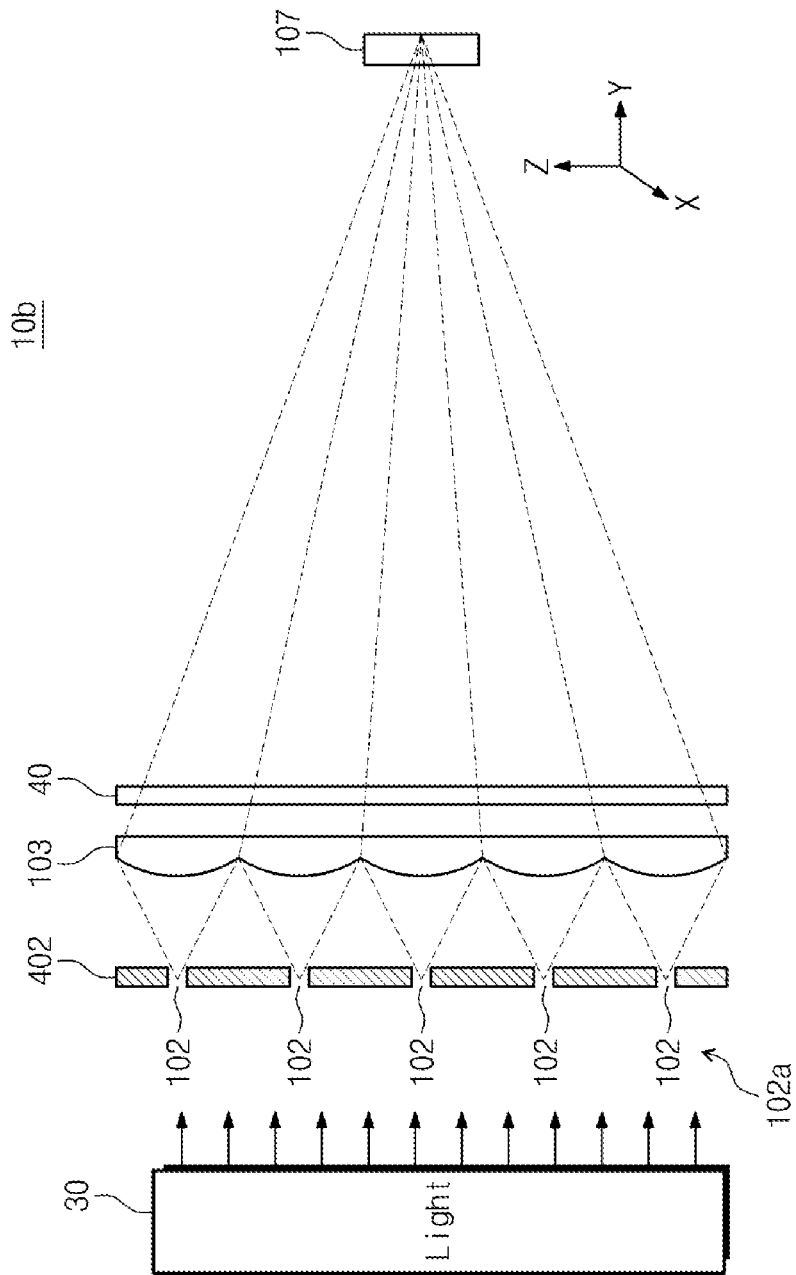

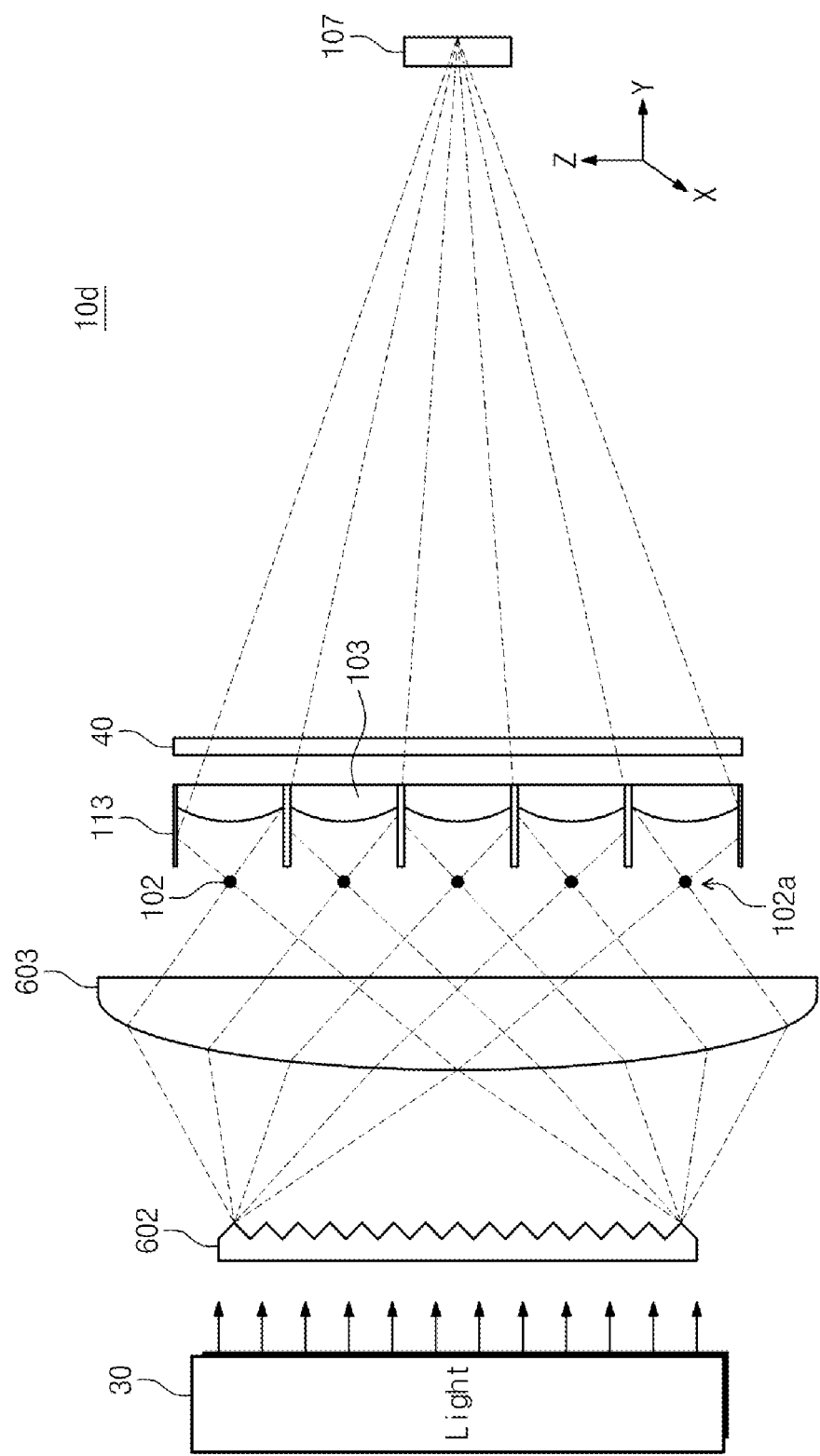

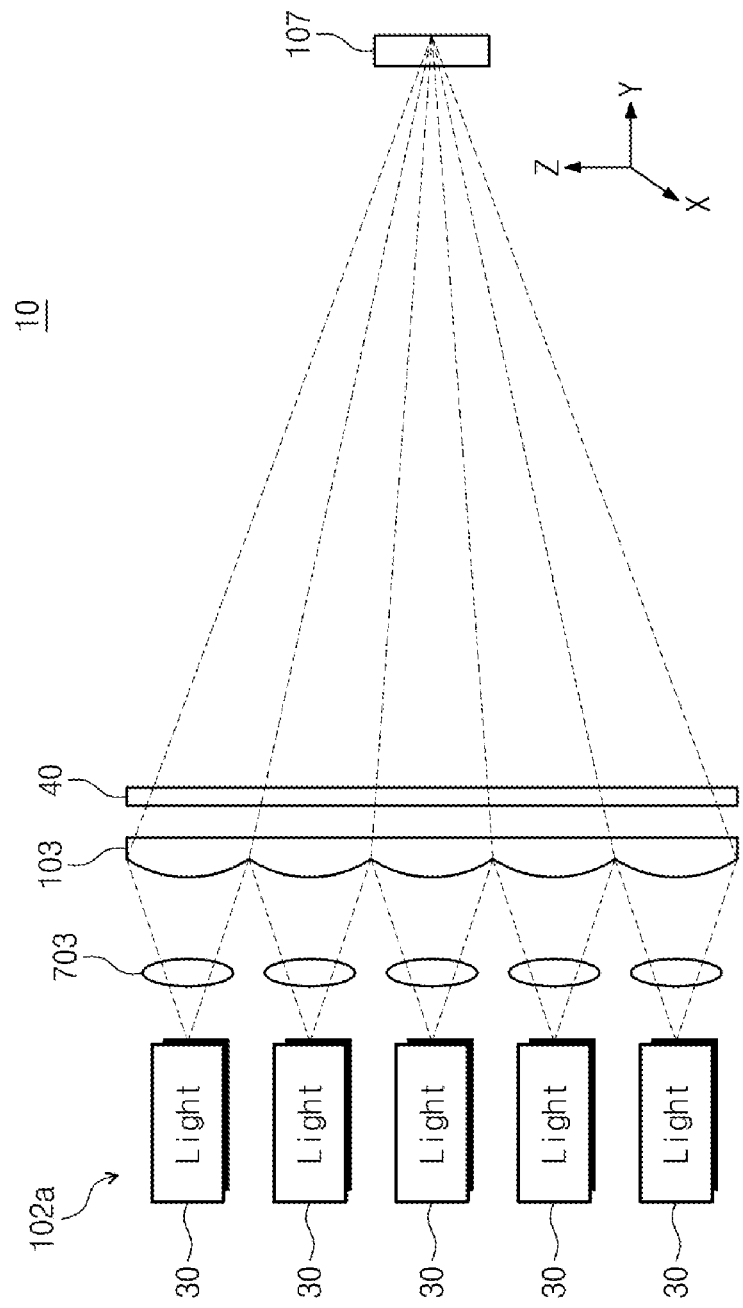

HOLOGRAPHIC DISPLAY APPARATUS CAPABLE OF STEERING VIEW WINDOW

CROSS-REFERENCE TO RELATED APPLICATIONS

This U.S. non-provisional patent application claims priority under 35 U.S.C. §119 to Korean Patent Application No. 10-2012-0015515, filed on Feb. 15, 2012, the entirety of which is incorporated by reference herein.

BACKGROUND

The inventive concept relates to holographic display apparatuses and, more particularly, to holographic display apparatuses capable of steering a view window.

Holographic display apparatuses may regenerate light wave of an object to make a three-dimensional (3D) image. The holographic display apparatuses may provide an actual image as shown through a mirror or a lens. A hologram 3D image may be a diffraction image of a coherent light, such that diffraction property of a light modulating device may greatly affect performance of the holographic display apparatuses. In principle, a volume and a view angle of the 3D image displayed by the holographic display apparatuses may be determined depending on a space-bandwidth provided by a spatial light modulating module. Thus, a device having very large space-bandwidth may be demanded for putting the holographic display apparatuses to practical use. However, performance of a current spatial light modulating device may be insufficient.

For enlarging a 3D space displayed by a digital holographic display apparatus, a view window may be limited to a pupil size of an eye so as to enlarge a size of the 3D space felt by an observer. This holographic display apparatus may demand an input optical system and an output optical system which randomly steer the view window according to a position of the pupil of the observer and provide the hologram image to both eyes of the observer. A function freely controlling the view window in all directions may be demanded in order that the observer naturally sees the hologram image.

SUMMARY

Embodiments of the inventive concept may provide holographic display apparatuses capable of freely steering a view window.

In one aspect, a holographic display apparatus may include: a light source module configured to generate coherent light; at least two input optical systems configured to converge the light generated from the light source module on at least two converging points; an output optical system configured to mix the lights provided from the at least two input optical systems to provide a hologram image; and a spatial light modulating module configured to modulate the light.

In some embodiments, the at least two input optical systems may include: a first input optical system configured to converge the light on a first converging point of the at least two converging points; and a second input optical system configured to converge the light on a second converging point of the at least two converging points, the second converging point being disposed at a different position from the first converging point.

In other embodiments, the input optical system may include: a lens array including a plurality of unit lenses; a point light source array including a plurality of point light sources, the plurality of point light sources inputting light to the lens array; and a driving part configured to move the point light source array.

In still other embodiments, the input optical system may further include a pin hole array including a plurality of pin holes between the lens array and the light source module. The light source module may include a surface light source. The coherent light generated from the surface light source may pass through the pin hole array to form the point light source array.

In even other embodiments, the input optical system may further include a plurality of optical fibers configured to provide paths of the light from the light source module to the lens array. First end parts of the optical fibers may be combined with the light source module. Second end parts of the optical fibers may constitute the point light source array.

In yet other embodiments, the input optical system may further include a plurality of lenses disposed between the lens array and the second end parts of the optical fibers. The plurality of lenses may correspond to the second end parts of the optical fibers in one-to-one manner.

In yet still other embodiments, the input optical system may further include: a diffraction grating disposed between the light source module and the lens array; and a converging lens disposed between the diffraction grating and the lens array. The light source module may include a surface light source; and the coherent light generated from the surface light source may form the point light source array between the converging lens and the lens array.

In yet still other embodiments, the lens array may further include a plurality of reflection plates disposed between the unit lenses.

In yet still other embodiments, the light source module may include a plurality of point light sources corresponding to the unit lenses in one-to-one manner; and the point light sources may constitute the point light source array.

In yet still other embodiments, the input optical system may further include a plurality of lenses which are disposed between the lens array and the light source module. The plurality of lenses may correspond to the point light sources in one-to-one manner.

In yet still other embodiments, the output optical system may include a beam divider disposed between the first input optical system and the second input optical system. The beam divider may converge the coherent lights outputted from the first and second input optical systems on the first and second converging points.

In yet still other embodiments, the spatial light modulating module may include a liquid crystal panel which complex-modulates an amplitude and a phase of the coherent light.

In another aspect, a holographic display apparatus may include: first and second light source modules configured to generate first and second coherent lights, respectively; a first input optical system including a first lens array configured to converege the first coherent light generated from the first light source module on a first converging point; a second input optical system including a second lens array configured to converge the second coherent light generated from the second light source module on a second converging point; an output optical system configured to mix lights generated from the first and second input optical systems to provide an hologram image; and first and second spatial light modulating modules configured to complex-modulate phases and amplitudes of the first and second coherent lights, respectively.

In some embodiments, the first input optical system may further include: a first pin hole array having a plurality pin holes disposed between the first light source module and the first lens array; and a first driving part configured to move the first pin hole array. The second input optical system may further include: a second pin hole array having a plurality pin holes disposed between the second light source module and the second lens array; and a second driving part configured to move the second pin hole array. Positions of the first and second converging points may be changed by movement of the first and second pin hole arrays.

In other embodiments, the first input optical system may further include: a plurality of first optical fibers configured to provide paths of the first coherent light from the first light source module to unit lenses of the first lens array, end parts of the first optical fibers constituting a first point light source array; and a first driving part configured to move the end parts of the first optical fibers. The second input optical system may further include: a plurality of second optical fibers configured to provide paths of the second coherent light from the second light source module to unit lenses of the second lens array, end parts of the second optical fibers constituting a second point light source array; and a second driving part configured to move the end parts of the second optical fibers. Positions of the first and second converging points may be changed by movement of the end parts of the first and second optical fibers.

In still other embodiments, the first input optical system may further include: a first diffraction grating disposed between the first light source module and the first lens array; and a first converging lens disposed between the first diffraction grating and the first lens array. The second input optical system may further include: a second diffraction grating disposed between the second light source module and the second lens array; and a second converging lens disposed between the second diffraction grating and the second lens array. The first coherent light generated from the first light source module may be formed into a first point light source array including a plurality of point light sources between the first converging lens and the first lens array; and the second coherent light generated from the second light source module may be formed into a second point light source array including a plurality of point light sources between the second converging lens and the second lens array.

In even other embodiments, the first input optical system may further include a first driving part configured to tilt the first light source module so as to change an incident direction of the first coherent light to the first diffraction grating. The second input optical system may further include a second driving part configured to tilt the second light source module so as to change an incident direction of the second coherent light to the second diffraction grating. Positions of the first and second converging points may be changed by changing of the incident directions of the first and second coherent lights.

In yet other embodiments, the first light source module may include a plurality of first point light sources corresponding to unit lenses of the first lens array in one-to-one manner. The second light source module may include a plurality of second point light sources corresponding to unit lenses of the second lens array in one-to-one manner.

In still another aspect, a holographic display apparatus may include: a point light source array including a plurality of point light sources; a lens array including unit lenses configured to converge coherent light inputted from the point light source array on a view window; and a driving part configured to move a position of the point light source array. The driving part may move the point light source array to change a position of the view window.

In some embodiments, the holographic display apparatus may further include: a light source module configured to generate the coherent light; and a point light source generating device disposed between the light source module and the lens array. The point light source generating device may include one of a pin hole array, optical fibers, and a diffraction grating which make the point light source array from the coherent light generated from the light source module.

BRIEF DESCRIPTION OF THE DRAWINGS

The inventive concept will become more apparent in view of the attached drawings and accompanying detailed description.

FIGS. 4A and 4B are schematic diagrams illustrating another modified example of an input optical system of a holographic display apparatus according to embodiments of the inventive concept;

FIGS. 6A and 6B are schematic diagrams illustrating yet another modified example of an input optical system of a holographic display apparatus according to embodiments of the inventive concept; and FIG. 7 is a schematic diagram illustrating a modified example of a light source module of a holographic display apparatus according to embodiments of the inventive concept.

DETAILED DESCRIPTION OF THE EMBODIMENTS

Figure 1:
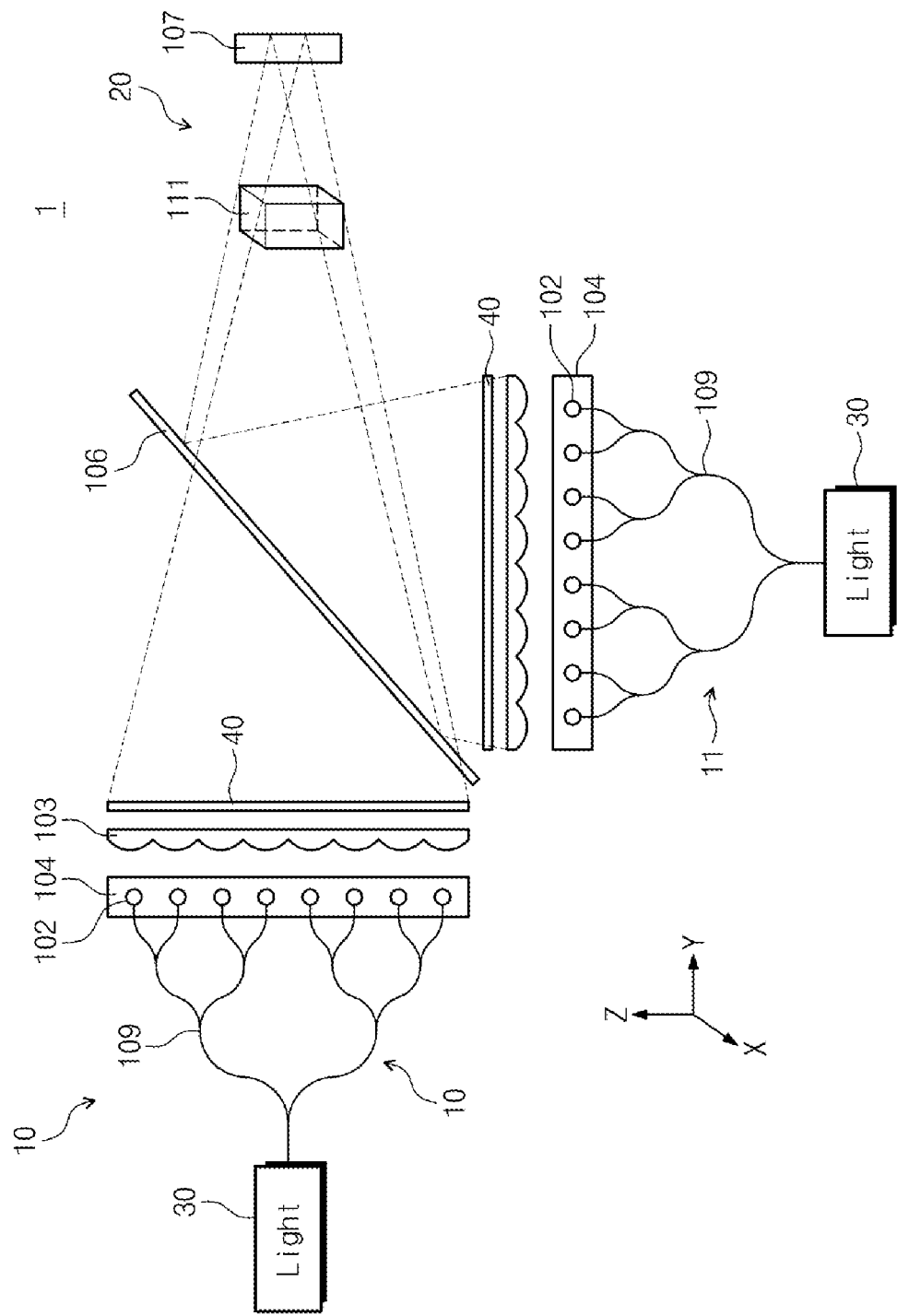
FIG. 1 is a schematic diagram illustrating a holographic display apparatus according to embodiments of the inventive concept.

The inventive concept will now be described more fully hereinafter with reference to the accompanying drawings, in which exemplary embodiments of the inventive concept are shown. The advantages and features of the inventive concept and methods of achieving them will be apparent from the following exemplary embodiments that will be described in more detail with reference to the accompanying drawings. It should be noted, however, that the inventive concept is not limited to the following exemplary embodiments, and may be implemented in various forms. Accordingly, the exemplary embodiments are provided only to disclose the inventive concept and let those skilled in the art know the category of the inventive concept. In the drawings, embodiments of the inventive concept are not limited to the specific examples provided herein and are exaggerated for clarity.

The terminology used herein is for the purpose of describing particular embodiments only and is not intended to limit the invention. As used herein, the singular terms "a," "an" and "the" are intended to include the plural forms as well, unless the context clearly indicates otherwise. As used herein, the term "and/or" includes any and all combinations of one or more of the associated listed items. It will be understood that when an element is referred to as being "connected" or "coupled" to another element, it may be directly connected or coupled to the other element or intervening elements may be present.

Similarly, it will be understood that when an element such as a layer, region or substrate is referred to as being "on" another element, it can be directly on the other element or intervening elements may be present. In contrast, the term "directly" means that there are no intervening elements. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof. The same reference numerals or the same reference designators denote the same elements throughout the specification.

Embodiment of Holographic Display Apparatus

Figure 2:
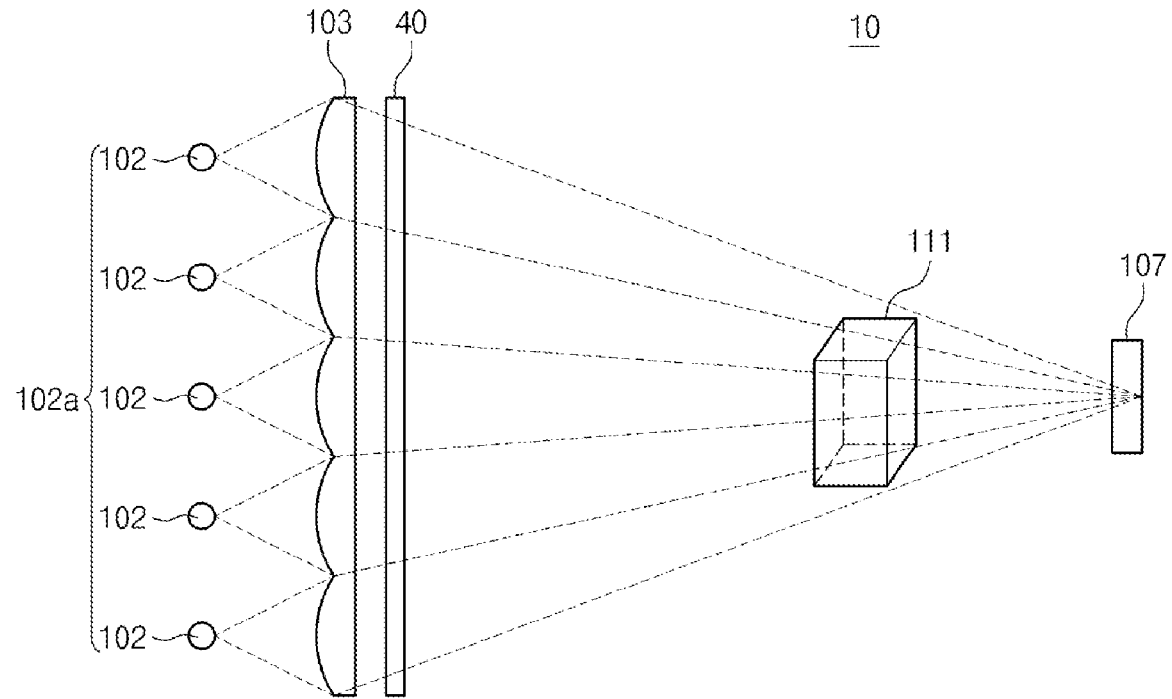
FIG. 2 is a schematic diagram illustrating an input optical system of a holographic display apparatus according to embodiments of the inventive concept.

FIG. 1 is a schematic diagram illustrating a holographic display apparatus according to embodiments of the inventive concept. FIG. 2 is a schematic diagram illustrating an input optical system of a holographic display apparatus according to embodiments of the inventive concept.

Referring to FIGS. 1 and 2, a holographic display apparatus 1 may include a light source module 30 generating light, at least two input optical systems 10 and 11, a spatial light modulating module 40, and an output optical system 20. The at least two input optical systems 10 and 11 may converge the light provided from the light source module 30 on a view window 107. The spatial light modulating module 40 may complex-modulate a light wave. The output optical system 20 may mix the lights converged by the at least two input optical systems 10 and 11 to provide a hologram three-dimensional (3D) image to both eyes of an observer.

The light source module 30 may include a device generating coherent light. For example, the light source module 30 may include a white light source device such as a cold cathode fluorescent lamp (CCFL) or a white light emitting diode. In other embodiments, the light source module 30 may include red, green and blue laser devices, or red, green, blue light emitting diodes. The light emitting diodes may be organic light emitting diodes. The light source module 30 may include a point light source or a surface light source. The coherent light may have a property determining a longitudinal axis of a view volume which can be displayed. In some embodiments, the light module 30 may include two light source modules which provide lights to the two input optical systems 10 and 11, respectively. In other embodiments, the light source module 30 may be one light source module which provides the lights to the two input optical systems 10 and 11 simultaneously.

The at least two input optical systems 10 and 11 may include a first input optical system 10 and a second input optical system 11 which has the same elements as or similar elements to those of the first input optical system 10. The second input optical system 11 may be disposed at a different position from the first input optical system 10. A traveling direction and a converging point of the light from the first input optical system 10 may be different from a traveling direction and a converging point of the light from the second input optical system 11, respectively. For example, the first input optical system 10 may input the light in a horizontal direction, and the second input optical system 11 may input the light in a vertical direction. In the present embodiment, the first input optical system 10 may converge the light on a left eye (or a right eye) of the observer, and the second input optical system 11 may converge the light on a right eye (or a left eye) of the observer.

The first input optical system 10 may include a point light source array 102a including a plurality of point light sources 102, a lens array 103 converging the light incident from the point light source array 102a, and a driving part 104 steering a position of the point light array 102a for changing a position of the view window 107. The second input optical system 11 may comprise the same elements as or similar elements to those of the first input optical system 10. Hereinafter, the first input optical system 10 will be described in detail. In the specification, the descriptions of the first input optical system 10 may be applied to the second input optical system 11. In other embodiments, the holographic display apparatus 1 may include only one of the first input optical system 10 and the second input optical system 11.

The light generated from the light source module 30 may be moved along a light path 109 to generate the point light source array 102a. The light path 109 may be diverged one or more times. The point light source array 102a may be generated by a pin hole array 402 as illustrated in FIG. 4A or a plurality of optical fibers 501 as illustrated in FIG. 5. In other embodiments, the point light source array 102a may be generated by a diffraction grating 602 as illustrated in FIG. 6A or a plurality of light source modules 30 as illustrated in FIG. 7.

The driving part 104 may move the point light source array 102a in at least one of front and back directions (X-axis direction), left and light directions (Y-axis direction), and up and down direction (Z-axis direction). For example, the point light source array 102a of the first input optical system 10 may be moved in the Z-axis direction and the X-axis direction, and the point light source array 102a of the second input optical system 11 may be moved in the Y-axis direction and the X-axis direction. The X-axis, Y-axis, and Z-axis directions may cross each other. However, the inventive concept is not limited thereto. The X-axis, Y-axis, and Z-axis directions may be substantially perpendicular to each other. The driving part 104 may include a mechanical or electric device. In the specification, moving the point light source array 102a means that a device generating the point light source array 102a may be moved or tilted. For example, the device generating the point light source array 102a may be the pin hole array 402 of FIG. 4A, the optical fibers 501 of FIG. 5, the light source module 30 of FIG. 6A, or the light source modules 30 of FIG. 7.

The spatial light modulating module 40 may include a spatial light modulator (SLM) which can display a hologram fringe pattern. For example, the spatial light modulating module 40 may include a liquid crystal panel which is able to modulate complex values of an amplitude and a phase of light wave. The spatial light modulating module 40 may be disposed between the lens array 103 and the view window 107.

The lens array 103 may include a plurality of convergence lenses. For example, the lens array 103 may include spherical lenses which correspond to the plurality of point light sources 102 in one-to-one manner. The light generated from each of the point light sources 102 may converge on the view window 107 through a unit lens of the lens array 103.

The output optical system 20 may mix the lights generated from the first input optical system 10 and the second input optical system 11 and then converge the mixed lights on the view window 107 by a beam divider 106 to provide the hologram 3D image 111 to the both eyes of the observer.

According to the present embodiment, since the point light source array 102a is able to be moved in all directions, the position of the view window 107 may be moved in all directions. Thus, even though a portion of the both eyes of the observer is changed, the position of the view window 107 may be suitably controlled.

Even though not shown in the drawings, the holographic display apparatus 1 may further include a pupil tracking module, a hologram calculating module, and/or a central input/output control module. The holographic display apparatus 1 may track the pupils of the observer by the pupil tracking module so as to calculate the hologram suitable to the position of the view window 107. The tracking of the pupil position and the generation of the hologram may be interlocked with each other in real time. The interlocking technique may be performed by the central input/output control module.

Hereinafter, modified examples of the first input optical system 10 and a modified example of the light source module 30 will be described. The following descriptions may be applied to the second input optical system 11.

Modified Example 1 of Input Optical System

Figure 3:
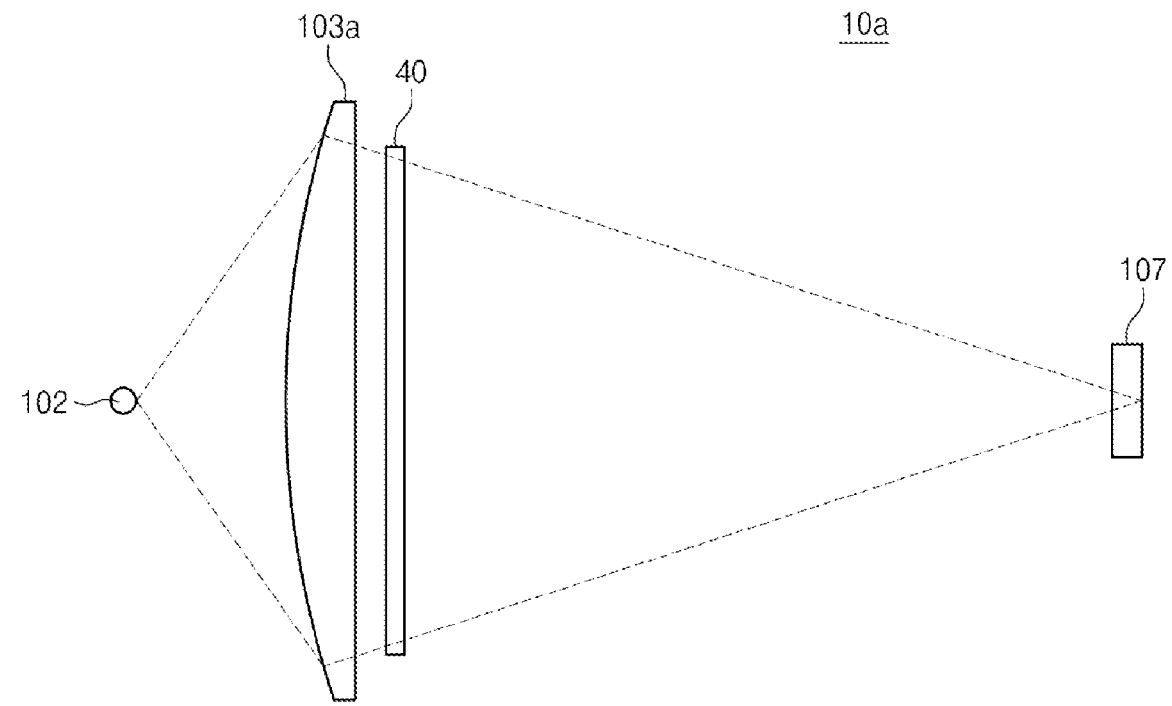
FIG. 3 is a schematic diagram illustrating a modified example of an input optical system of a holographic display apparatus according to embodiments of the inventive concept.

FIG. 3 is a schematic diagram illustrating a modified example of an input optical system of a holographic display apparatus according to embodiments of the inventive concept.

Referring to FIG. 3, a first input optical system 10a may include a single converging lens 103a instead of the lens array 103. Additionally, the first input optical system 10a may include a single point light source 102 instead of the point light source array 102a. For example, the converging lens 103a may include a spherical lens of which both surfaces are spherical surfaces, or a spherical lens of which a single surface is a spherical surface. The first input optical system 10a may irradiate the light wave provided from the point light source 102 to the spatial light modulating module 40 where a hologram is encoded in order that the light wave converges on the view window 107.

Modified Example 2 of Input Optical System

Figure 4B:
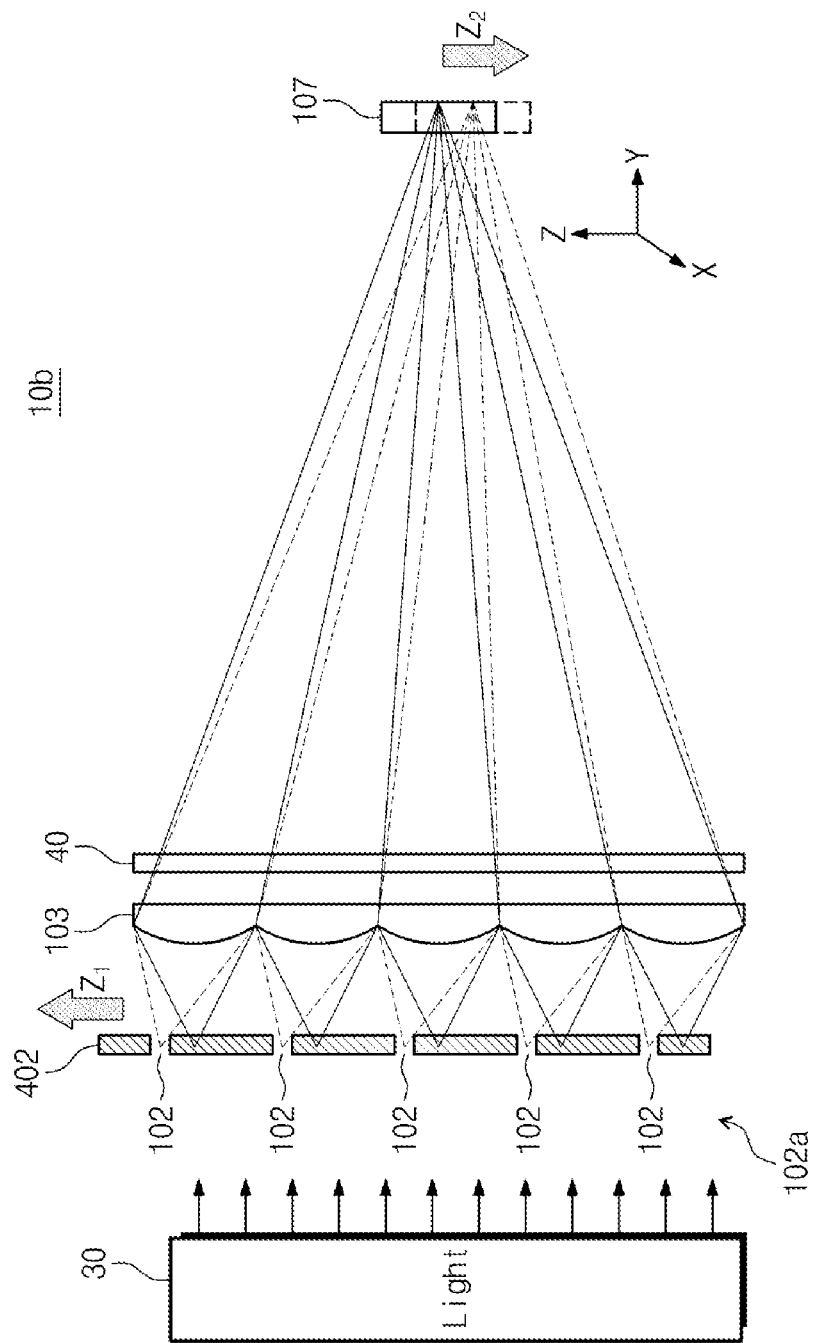
Figure 5:
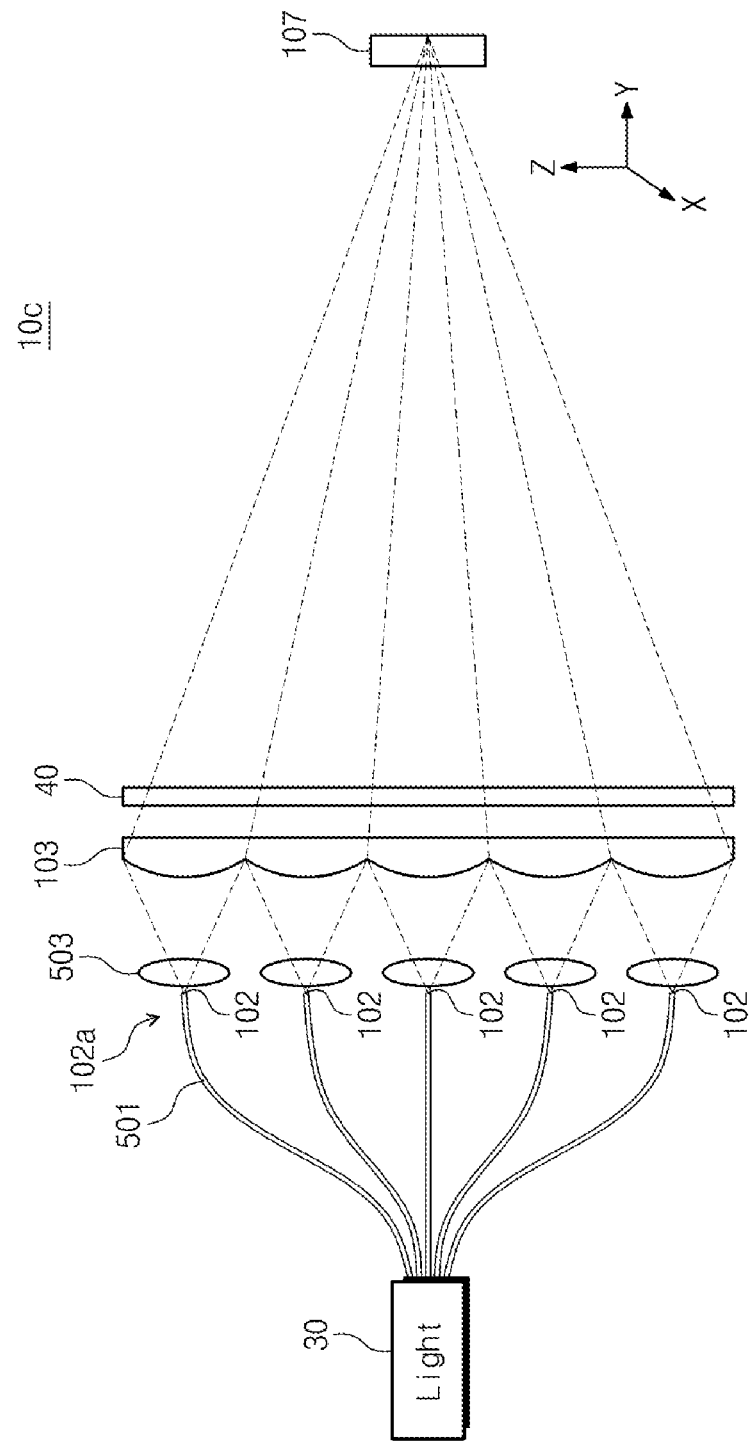
FIG. 5 is a schematic diagram illustrating still another modified example of an input optical system of a holographic display apparatus according to embodiments of the inventive concept.

FIGS. 4A and 4B are schematic diagrams illustrating another modified example of an input optical system of a holographic display apparatus according to embodiments of the inventive concept.

Referring to FIG. 4A, a first input optical system 10b may include a pin hole array 402 used as the point light source array 102a. In some embodiments, the first input optical system 10b may include the pin hole array 402 including a plurality of pin holes through which the light generated from the light source module 30 passes, and the lens array 103. The light source module 30 according to the present embodiment may include a surface light source. The surface light source may generate coherent light. The pin hole array 402 may be disposed between the surface light source and the lens array 103. The pin hole array 402 may replace the surface light source with the point light source array 102a consisting of a plurality of point light sources 102. In some embodiments, the light wave generated from the light source module 30 may be incident to the pin hole array 402 and then the wave light passing through the pin holes may be changed into the point light sources 102. The pin hole array 402 may be moved in the X-axis, Y-axis, and Z-axis directions. The movement of the pin hole array 402 may be performed by the driving part 104 of FIG. 1.

Referring to FIG. 4B, for example, when the pin hole array 402 may be upward moved, the point light source array 102a may be moved in an upward vertical direction $Z_1$. The view window 107 may be moved in a downward vertical direction $Z_2$ by the movement of the point light source array 102a in the upward vertical direction $Z_1$. A full line in FIG. 4B may show a traveling path of the light wave before the pin hole array 402 is moved, and a dot line in FIG. 4B may show a traveling path of the light wave after the pin hole array 402 is moved.

Modified Example 3 of Input Optical System

FIG. 5 is a schematic diagram illustrating still another modified example of an input optical system of a holographic display apparatus according to embodiments of the inventive concept.

Referring to FIG. 5, a first input optical system 10c may include optical fibers 501 constituting the point light source array 102a. For example, the first input optical system 10c may include a plurality of optical fibers 501 connected to the light source module 30 and a lens array 103. The light generated from the light source module 30 may be moved along the optical fibers 501 and then be irradiated to the lens array 103. The optical fibers 501 may correspond to the unit lenses of the lens array 103 in one-to-one manner. End parts of the optical fibers 501 which are opposite to the lens array 103 may be the point light sources 102, respectively. Thus, the end parts of the optical fibers 501 may constitute the point light source array 102a. The end parts of the optical fibers 501 may be moved in the X-axis, Y-axis, and Z-axis directions. Moving the end parts of the optical fibers 501 may be performed by the driving part 104 of FIG. 1. The position of the view window 107 may be changed by the movement of the end parts of the optical fibers 501 (i.e., the point light source array 102a).

The first input optical system 10c may further include a plurality of lenses 503 provided between the lens array 103 and the optical fibers 501. The lenses 503 may be adjacent to the end parts of the optical fibers 501 (i.e., the point light sources 102), respectively. Thus, the intensities of the lights generated from the point light sources 102 may be substantially uniform by the lenses 503. The lenses 503 may correspond to the point light sources 102 in one-to-one manner.

Modified Example 4 of Input Optical System

Figure 6B:
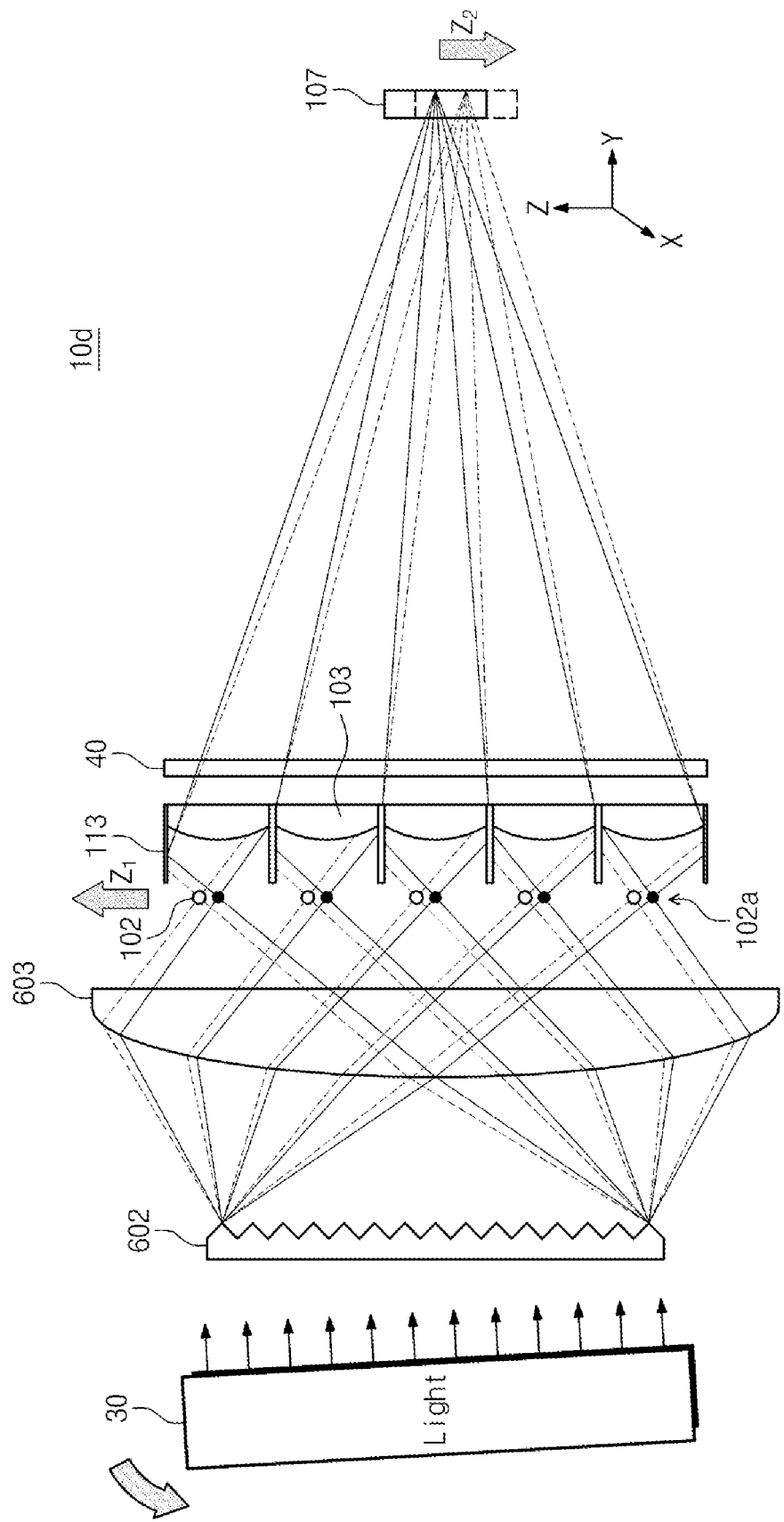

FIGS. 6A and 6B are schematic diagrams illustrating yet another modified example of an input optical system of a holographic display apparatus according to embodiments of the inventive concept.

Referring to FIG. 6A, a first input optical system 10d may include a diffraction grating 602 constituting the point light source array 102a. The first input optical system 10d may change an incident direction of the light source, so that the position of the point light source array 102a may be changed. For example, the first input optical system 10d may include the diffraction grating 602 diffracting the light generated from the light source module 30, a converging lens 603, and a lens array 103 including reflection plates 112. The light source module 30 may include a surface light source, and the converging lens 603 may include a spherical lens. The light wave generated from the light source module 30 may be diffracted by the diffraction grating 602 and then be incident to the converging lens 603. The light wave passing through the converging lens 603 may be incident to the lens array 103. The light wave passing through the converging lens 603 may form the point light source 102a consisting of a plurality of point light sources 102 between the converging lens 603 and the lens array 103. The reflection plates 113 may be included in the lens array 103, so that the traveling paths of the light waves may be concentrated to the lens array 103. The light source module 30 may be moved in the X-axis, Y-axis, and Z-axis directions. Additionally, the light source module 30 may be tilted in at least one of the X-axis, Y-axis, and Z-axis directions. The incident direction of the light to the diffraction grating 602 may be changed by the tilting of the light source module 30, such that the position of the point light source array 102a may be changed.

Referring to FIG. 6B, for example, if the light source module 30 is tilted to turn the incident direction f the light upward, the point light source array 102a may be moved in an upward vertical direction $Z_1$. The view window 107 may be moved in a downward vertical direction $Z_2$ by the movement of the point light source array 102a in the upward vertical direction $Z_1$. Black points in FIG. 6B are the point light sources 102 before the point light source array 102a is moved, and white points in FIG. 6B are the point light sources 102 after the point light source array 102a is moved. Full lines in FIG. 6B are light paths before the point light source array 102a is moved, and dot lines in FIG. 6B are light paths after the point light source array 102a is moved.

Modified Example of Light Source Module

FIG. 7 is a schematic diagram illustrating a modified example of a light source module of a holographic display apparatus according to embodiments of the inventive concept.

Referring to FIG. 7, a point light source array 102a may consist of a plurality of light source modules 30. For example, each of the light source modules 30 may be each of point light sources 102 of the point light source array 102a. The light source modules 30 may correspond to unit lenses of the lens array 103 in one-to-one manner. The light source modules 30 may be moved in the X-axis, Y-axis, and z-axis directions. As a result, the point light source array 102a may be moved to change the position of the view window 107. Moving the light source modules 30 may be performed by the driving part 104 of FIG. 1. A plurality of lenses 703 may further be disposed between the lens array 103 and the light source modules 30. The lenses 703 may correspond to the light source modules 30 in one-to-one manner. The intensities of the lights generated from the light source modules 30 may be substantially uniform by the lenses 703.

According to embodiments of the inventive concept, spatial light modulated light wave may converge on the view window, such that the observer may see the hologram 3D image and the position of the observer may be tracked to freely steer the view window.

While the inventive concept has been described with reference to example embodiments, it will be apparent to those skilled in the art that various changes and modifications may be made without departing from the spirit and scope of the inventive concept. Therefore, it should be understood that the above embodiments are not limiting, but illustrative. Thus, the scope of the inventive concept is to be determined by the broadest permissible interpretation of the following claims and their equivalents, and shall not be restricted or limited by the foregoing description.

What is claimed is:

1. A holographic display apparatus comprising:
a light source module configured to generate coherent light;
at least two input optical systems configured to converge the coherent light generated from the light source module on at least two converging points;
an output optical system configured to mix lights provided from the at least two input optical systems to provide a hologram image;
at least two spatial light modulating modules configured to modulate the coherent light and corresponding to the at least two input optical systems,
wherein each of the at least two input optical systems comprises:
a lens array including a plurality of unit lenses; and
a point light source generating device disposed between the light source module and the lens array and configured to make a point light source array from the coherent light generated from the light source module,
wherein the point light source array includes a plurality of point light sources, the plurality of point light sources inputting light to the lens array, and
wherein the point light source generating device includes one of a pin hole array, a plurality of optical fibers, and a diffraction grating.

2. The holographic display apparatus of claim 1, wherein the at least two input optical systems comprise:
a first input optical system configured to converge the coherent light on a first converging point of the at least two converging points; and
a second input optical system configured to converge the coherent light on a second converging point of the at least two converging points, the second converging point being disposed at a different position from the first converging point.

3. The holographic display apparatus of claim 2, wherein the output optical system includes a beam divider disposed between the first input optical system and the second input optical system; and
wherein the beam divider converges the lights provided from the first and second input optical systems on the first and second converging points, respectively.

4. The holographic display apparatus of claim 1, wherein each of the at least two input optical systems further comprises:
a driving part configured to move the point light source array.

5. The holographic display apparatus of claim 4, wherein each of the at least two input optical systems comprises the pin hole array including a plurality of pin holes between the lens array and the light source module,
wherein the light source module includes a surface light source; and
wherein the coherent light generated from the surface light source passes through the pin hole array to form the point light source array.

6. The holographic display apparatus of claim 4, wherein each of the at least two input optical systems comprises the plurality of optical fibers configured to provide paths of the coherent light from the light source module to the lens array,
wherein first end parts of the optical fibers are combined with the light source module; and
wherein second end parts of the optical fibers constitute the point light source array.

7. The holographic display apparatus of claim 6, wherein each of the at least two input optical systems further comprises a plurality of lenses disposed between the lens array and the second end parts of the optical fibers; and
wherein the plurality of lenses correspond to the second end parts of the optical fibers in one-to-one manner.

8. The holographic display apparatus of claim 4, wherein each of the at least two input optical systems comprises:
the diffraction grating disposed between the light source module and the lens array; and a converging lens disposed between the diffraction grating and the lens array, wherein the light source module includes a surface light source; and wherein the coherent light generated from the surface light source forms the point light source array between the converging lens and the lens array.

9. The holographic display apparatus of claim 8, wherein the lens array further includes a plurality of reflection plates disposed between the unit lenses.

10. The holographic display apparatus of claim 1, wherein each of the at least two spatial light modulating modules includes a liquid crystal panel which complex-modulates an amplitude and a phase of the coherent light.

11. The holographic display apparatus of claim 1,
wherein the light source module comprises
first and second light source modules configured to generate first and second coherent lights, respectively;
wherein a first input optical system of the at least two input optical systems includes a first lens array configured to converge the first coherent light generated from the first light source module on a first converging point;
wherein a second input optical system of the at least two input optical systems includes a second lens array configured to the second coherent light generated from the second light source module on a second converging point; and
wherein the at least two spatial light modulating modules comprise first and second spatial light modulating modules configured to complex-modulate phases and amplitudes of the first and second coherent lights, respectively.

12. The holographic display apparatus of claim 11,
wherein the first input optical system further comprises:
a first pin hole array having a plurality pin holes disposed between the first light source module and the first lens array; and
a first driving part configured to move the first pin hole array,
wherein the second input optical system further comprises:
a second pin hole array having a plurality pin holes disposed between the second light source module and the second lens array; and
a second driving part configured to move the second pin hole array, and
wherein positions of the first and second converging points are changed by movement of the first and second pin hole arrays.

13. The holographic display apparatus of claim 11,
wherein the first input optical system further comprises:
a plurality of first optical fibers configured to provide paths of the first coherent light from the first light source module to unit lenses of the first lens array, end parts of the first optical fibers constituting a first point light source array; and
a first driving part configured to move the end parts of the first optical fibers,
wherein the second input optical system further comprises:
a plurality of second optical fibers configured to provide paths of the second coherent light from the second light source module to unit lenses of the second lens array, end parts of the second optical fibers constituting a second point light source array; and
a second driving part configured to move the end parts of the second optical fibers, and wherein positions of the first and second converging points are changed by movement of the end parts of the first and second optical fibers.

14. The holographic display apparatus of claim 11,
wherein the first input optical system further comprises:
a first diffraction grating disposed between the first light source module and the first lens array; and
a first converging lens disposed between the first diffraction grating and the first lens array,
wherein the second input optical system further comprises:
a second diffraction grating disposed between the second light source module and the second lens array; and
a second converging lens disposed between the second diffraction grating and the second lens array,
wherein a first point light source array including a plurality of point light sources is formed from the first coherent light between the first converging lens and the first lens array, and
wherein a second point light source array including a plurality of point light sources is formed from the second coherent light between the second converging lens and the second lens array.

15. The holographic display apparatus of claim 14, wherein the first input optical system further comprises a first driving part configured to tilt the first light source module so as to change an incident direction of the first coherent light to the first diffraction grating,
wherein the second input optical system further comprises a second driving part configured to tilt the second light source module so as to change an incident direction of the second coherent light to the second diffraction grating,
wherein positions of the first and second converging points are changed by changing of the incident directions of the first and second coherent lights.

16. A holographic display apparatus comprising:
a light source module configured to generate the coherent light;
a point light source array including a plurality of point light sources;
a lens array including unit lenses configured to converge coherent light inputted from the point light source array on a view window;
a point light source generating device disposed between the light source module and the lens array; and
a driving part configured to move a position of the point light source array,
wherein the driving part moves the point light source array to change a position of the view window, and
wherein the point light source generating device includes one of a pin hole array, optical fibers, and a diffraction grating, which make the point light source array from the coherent light generated from the light source module.

17. A holographic display apparatus, comprising:
a light source module configured to generate coherent light;
at least two input optical systems configured to converge the coherent light generated from the light source module on at least two converging points;
an output optical system configured to mix lights provided from the at least two input optical systems to provide a hologram image;
at least two spatial light modulating modules configured to modulate the coherent light and corresponding to the at least two input optical systems, respectively, wherein each of the at least two input optical systems comprises:
a lens array including a plurality of unit lenses; and
a point light source array including a plurality of point light sources, the plurality of point light sources inputting the coherent light to the lens array, and wherein the light source module comprises a plurality of point light sources corresponding to the unit lenses in one-to-one manner, the point light sources constituting the point light source array, and wherein the input optical system further comprises a plurality of lenses which are disposed between the lens array and the light source module, the plurality of lenses corresponding to the point light sources of the light source module in one-to-one manner.

* * * * *